May 27, 1958

C. H. KAPLAN 2,836,791

MAGNETOMETERS

Filed July 29, 1953

INVENTOR
C. H. KAPLAN
BY:— Wilkinson & Mawhinney
ATTYS.

May 27, 1958   C. H. KAPLAN   2,836,791
MAGNETOMETERS
Filed July 29, 1953   4 Sheets-Sheet 2
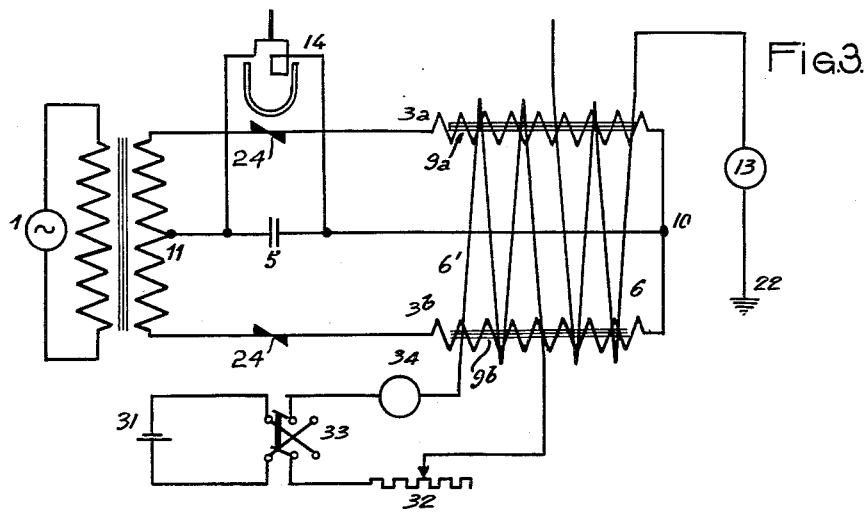
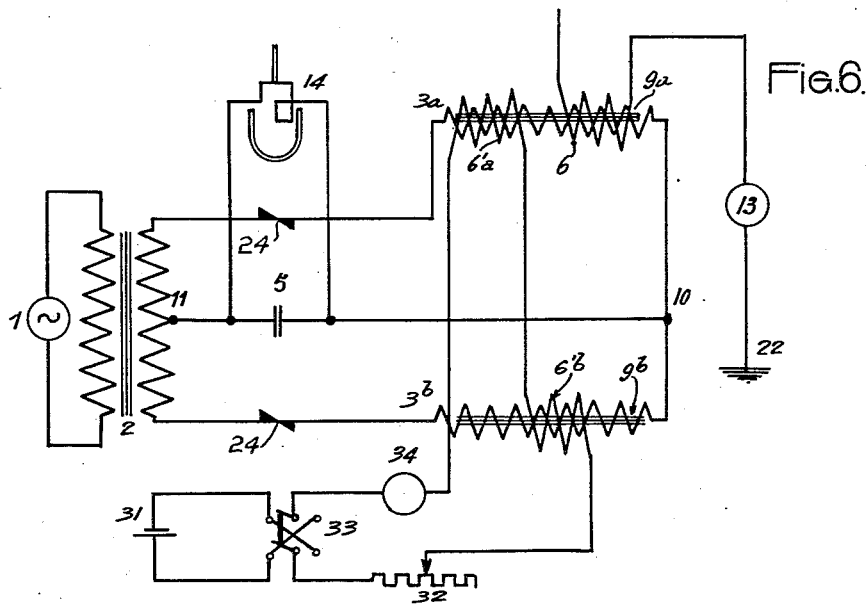
INVENTOR
C. H. KAPLAN
BY:- Wilkinson & Mawhinney
ATTYS.

May 27, 1958     C. H. KAPLAN     2,836,791
MAGNETOMETERS

Filed July 29, 1953     4 Sheets-Sheet 3

INVENTOR
C. H. KAPLAN
BY: Wilkinson & Mawhinney
ATTYS.

May 27, 1958

C. H. KAPLAN 2,836,791

MAGNETOMETERS

Filed July 29, 1953

INVENTOR
C. H. KAPLAN
BY Wilkinson & Mawhinney
ATTYS.

United States Patent Office 2,836,791
Patented May 27, 1958

2,836,791

MAGNETOMETERS

Charles Heiman Kaplan, Montrouge, France, assignor to Compagnie pour la Fabrication des Compteurs et Matériel d'Usines à Gaz, Montrouge, Seine, France, a joint-stock company of France Application July 29, 1953, Serial No. 370,968

Claims priority, application France July 31, 1952

6 Claims. (Cl. 324—43)

The present invention is concerned with magnetometers of the kind which are used for the determination by one single measurement of any particular component of a magnetic field.

Such magnetometers are known, of the type which contain an element sensitive to the magnetic field, and in which a magnetic field of opposite sign is created by a current passing through a solenoid which surrounds the said sensitive element, the intensity of the field being determined by the value of the current necessary to return to the zero point of its graduation, the galvanometer interposed in the circuit of the element which is sensitive to the magnetic field.

A magnetometer of this type is shown diagrammatically in Fig. 1. There is shown in this figure a generator 1 of alternating current which supplies the primary winding of a transformer 2. 3a and 3b represent two identical solenoids, within the interior of which are respectively located the cores 9a and 9b which are made of a ferro-magnetic alloy of high primary permeability. One end of each of these solenoids is connected to one extreme terminal of the secondary of the transformer 2, whilst the two other extremities are joined together at the point 10. Between the centre-point tapping 11 of the secondary winding of the transformer 2 and the common point 10 of the two ends of the solenoids 3a and 3b, there is connected a continuous-current galvanometer 4, across the terminals of which there is connected a condenser 5. Around the two solenoids 3a, 3b, there is wound a third solenoid 6, which will be termed hereafter the compensating solenoid, and which is connected in a circuit which includes a source of continuous current 7, a controlling rheostat 8, a change-over switch 12 and a milliammeter 13.

When there is no magnetic field acting on the cores 9a and 9b, the latter saturate themselves symmetrically in function of time, the magnetisation curves of each of these cores being displaced by 180° so that no current passes through the branch 10—11. If an external magnetic field acts on the cores 9a and 9b, the component of this field which follows the magnetic axis of these cores produces a dissymmetry in the magnetisation of the cores 9a and 9b. This dissymmetry causes a distortion of the current curves corresponding to the appearance of even harmonics in the magnetising current. By means of, for example, two non-linear resistances 24 which can be placed in series with each of the windings 3a, 3b, there is obtained in the circuit of the galvanometer 4, a rectified current, the alternating component of which is eliminated by the condenser 5. The operator causes a current to pass through the solenoid 6, the direction and the value of this current being such that the needle of the galvanometer 4 is brought back to the zero point of its scale. The current passing through the solenoid 6, which is necessary to reduce the current in the branch 10—11 to zero, is measured by the milliammeter 13. This current is proportional to the component of the field which follows the magnetic axis of the cores 9a and 9b. The apparatus 13 may be graduated in gauss (or in sub-multiples of gauss) so that the deflection of the needle will give a direct indication of the component of the field along the magnetic axis of the cores 9a and 9b.

This magnetometer has the drawback of requiring the intervention of an operator to regulate the current in the circuit of the solenoid 6 every time there is a variation in the magnetic field detected.

The object of the present invention is to overcome this drawback. The invention is characterised by means whereby the control of the current in the compensating solenoid is automatically effected by the out-of-balance current due to the magnetic dissymmetry in at least one of the cores made of an alloy of high primary permeability.

To this end, the invention contemplates the replacement of the galvanometer 4 by any automatic compensating device of known kind, such as a measurement converter, an automatic potentiometer, either electrical or non-electrical, an electronic or other amplifier, etc.

In the examples shown, the automatic compensating device is a measurement converter, the moving frame of which, with the opposing couple removed of the galvanometer inserted in the circuit of the element which is sensitive to the magnetic field, is rigidly coupled to the variable member of a device by means of which there is obtained a direct current passing through the solenoid 6, the direction and the value of this current controlling itself automatically so as to obtain a compensation of the variations of the magnetic field in the sensitive elements of the magnetometer.

The solenoid 6 may comprise several sections thus permitting the calibration of the magnetometer to be varied.

In acordance with an alternative embodiment of the invention, the element sensitive to the magnetic field is surrounded, in addition to the solenoid 6, by a second solenoid which is connected to the terminals of a source of direct current, the strength of which is variable, either by the operator or by an automatic device, by means of which, in the first place, the earth's magnetic field may be compensated, or the magnetic field, the variations of which are ultimately desired to be indicated.

In accordance with another form of embodiment of the invention, the circuit containing the source of direct current is connected in parallel across the terminals of the solenoid 6, so that the total current which passes through this solenoid compensates at the same time for the earth's magnetic field (or the magnetic field, the variations of which it is desired to indicate) and the variations of these magnetic fields.

The above mentioned alternative embodiment may comprise the following modifications: A circuit with a universal shunt connected in parallel across the terminals of the solenoid 6, is inserted in the automatic compensation device so that the current which leaves this device is divided between the shunt and the solenoid.

In accordance with still a further modification, the compensating solenoid only surrounds one of the two cores of ferro-magnetic alloy with a high primary permeability.

The invention is also concerned with certain methods of application of the said arrangements, in particular the application to the measurement of direct current of high intensity based on the action of the magnetic field created by the bar through which such a current passes.

Figs. 2, 3, 4, 5 and 6 of the accompanying drawings show, by way of example only and not in any way by limitation, different forms of embodiment of the invention.

Figure 1:
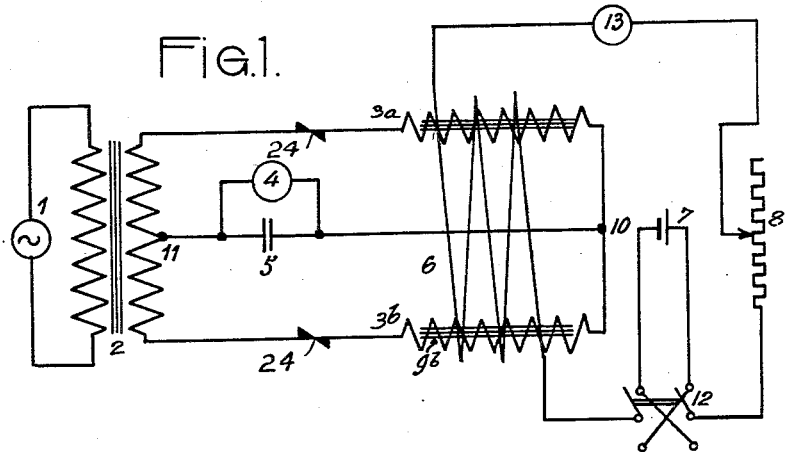
Figure 2:
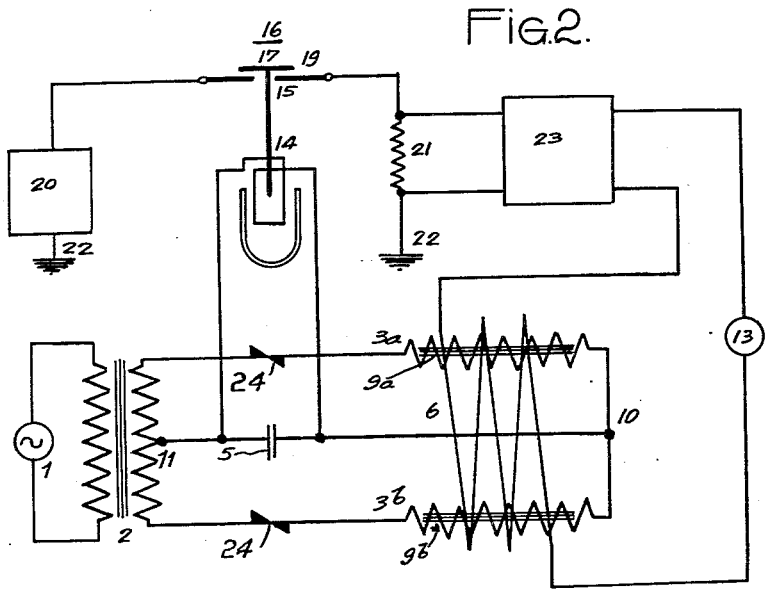

In Fig. 2, in which the reference numbers 1, 2, 3a, 3b, 5, 6, 10, 11 and 13 have the same meaning as in Fig. 1, 14 refers to the moving frame without its countercouple of a galvanometer, the moving spindle 15 of which is coupled to a variable member 16 which, in the example shown, is a condenser. The moving frame or coil 14 is included in the circuit 10—11 in the same way as the galvanometer 4 of Fig. 1. One of the sets of plates 17 of the condenser 16 is mounted on the shaft 15. This condenser comprises two sets of fixed plates, of which one, 18, is connected to an oscillator 20 which generates between this set of plates and the earth connection 22 a high-frequency voltage, while the other, 19, is connected to one end of an impedance 21, the other extremity of which is connected to earth at 22. There is thus obtained across the terminals of the impedance 21, a difference of potential which is a function of the position of the moving plates 17 and, in consequence, is also a function of the position of the moving coil 14. The potential across the terminals of the impedance 21 is applied to the input terminal of an amplifier-detector 23 of any known type.

The direct current voltage developed across the output terminals of this amplifier-detector is applied to a circuit which includes the solenoid 6 and the milliammeter 13 which is graduated in gauss.

When the detected magnetic field varies, the moving coil 14 rotates either in one direction or the other, and thereby causes the capacity of the condenser 16 to vary by virtue of the location of the set of plates 17 which are rigidly coupled to the moving coil 14. This results in a variation of current flowing through the impedance 21 and, in consequence, a variation of potential across the output terminals of the amplifier-detector 23. This variation of potential induces a variation of current in the solenoid 6, the direction and the value of which are such that the magnetic flux produced by this solenoid compensates exactly for the variation of the component of the detected magnetic field. There is thus obtained an automatic control of the current which is used for the measurement of the said magnetic field.

In the alternative embodiment in accordance with Fig. 3, the arrangement shown is the same as that of Fig. 2, but the solenoids 3a, 3b are surrounded, in addition, by a second solenoid 6' connected in a circuit which comprises a source of direct current 31, a rheostat 32, a change-over switch 33 and a milliammeter 34.

The advantage of this arrangement is to be able first of all to compensate the component of the earth's magnetic field along the magnetic axis of the cores 9a and 9b, or of the magnetic field, the variations of which are subsequently to be observed. In the example shown, the current flowing in the circuit of the solenoid 6' is varied by the operator who controls the rheostat 32 in such a way that the pointer of the milliammeter 13 is restored to the zero point of its graduation. In these conditions, the pointer of the milliammeter 13 will only show a deflection if the magnetic field detected varies. This arrangement enables the sensitivity of the magnetometer to be increased to a very high degree.

The value of the total magnetic field is obtained at any instant by adding together the indications of the two milliammeters 34 and 13.

Figure 4:
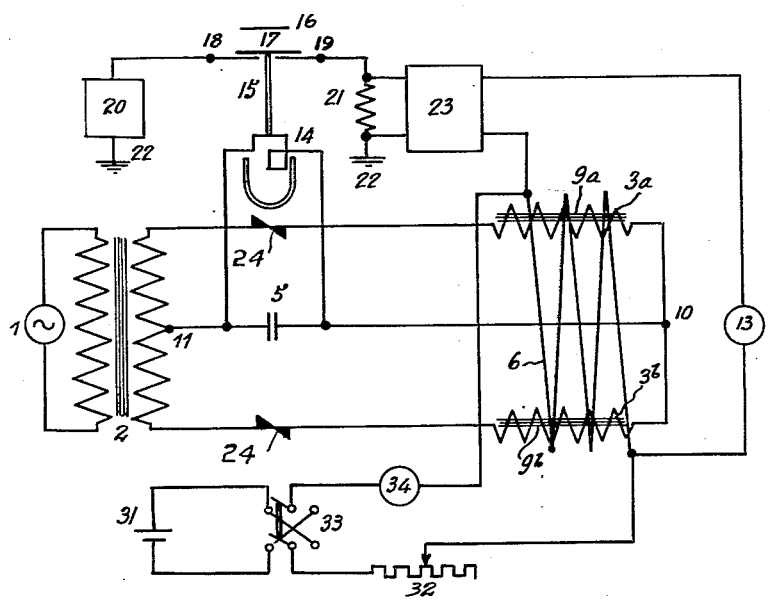

In the alternative embodiment shown in Fig. 4, the arrangement shown is based on the same principle as that of Fig. 3, but the circuit which is provided to compensate for the component of the earth's magnetic field or of the magnetic field, the variations of which are required to be detected (the circuit including the source 31 of direct current, the rheostat 32, the change-over switch 33 and the milliammeter 34), is connected in shunt across the terminals of the solenoid 6. This arrangement enables the second solenoid, indicated at 6' in Fig. 3, to be dispensed with.

Figure 5:
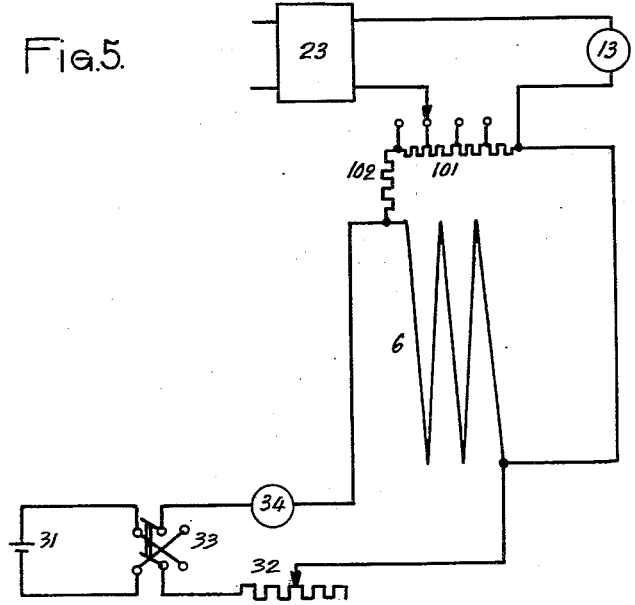

Fig. 5 shows a modification of the form of embodiment given in Fig. 4. A universal shunt 101 with multiple tappings and a fixed resistance 102 are connected in parallel across the terminals of the solenoid 6. The universal shunt 101 is furthermore inserted in the output circuit of the amplifier-detector 23 in series with the milliammeter 13.

In the alternative embodiment shown in Fig. 6, the solenoid 6 which is provided for the automatic compensation, only surrounds the magnetic core 9a. The solenoid 6' comprises two windings 6'a and 6'b. By this means, the two sensitive elements may be separated and they may be located at a considerable distance from each other.

The two sensitive elements are first of all placed in the same magnetic field and the current in the windings 6'a and 6'b is regulated in such a way as to bring the pointer of the milliammeter 13 back to zero.

The magnetometer being thus calibrated, the sensitive element comprising the core 9a is moved to a certain distance. If the magnetic field is the same as it was before, the milliammeter 13 remains at zero, but if the contrary is the case, it shows a deflection which gives a direct indication of the difference between the two fields.

Although several forms of embodiment of the invention have been shown, it is quite clear that the invention is not to be limited to those particular forms, which have been given simply by way of example and which have no restrictive nature, and that in consequence, all the alternative forms of embodiment having the same principle and the same object as the arrangement referred to above, would, like those arrangements, fall within the scope of the present invention.

In particular, the variable element associated with the moving coil of the galvanometer, having its countercouple removed (which element in the case of the examples shown in the moving plates of a condenser) may be the moving coil of a mutual inductance coil placed in the magnetic field produced by the fixed winding which is supplied from an alternating current source. This variable element may also be a mirror which directs a luminous beam on to a photo-electric cell or again it may be a bolometer device.

Figure 7:
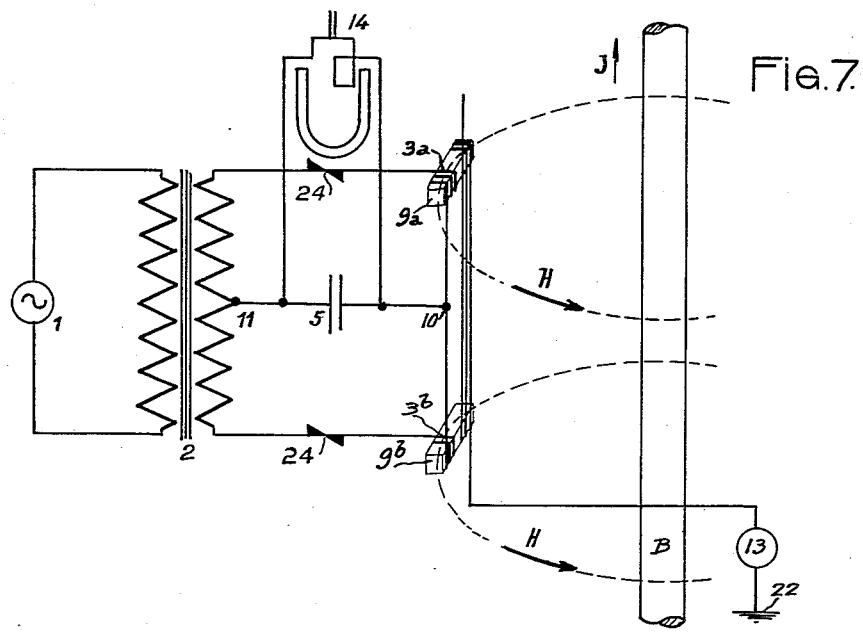
Fig. 7 shows the device in accordance with the invention when it is applied to the measurement of direct current of high intensity.

Fig. 7 shows a diagrammatic form of the arrangement of Fig. 2 applied to the measurement of a direct current of high intensity flowing through a bar.

In this figure, where the various circuit components have the same reference numbers as in Fig. 2, B represents a bar through which passes a direct current J of high intensity. This direct current produces, as is well known, a magnetic field H, the lines of force of which are circles, the axis of which is the bar B. The value of this magnetic field is proportional to the direct current J which passes through the bar B and is inversely proportional to the distance between the centre of the bar and the element which is sensitive to the magnetic field. The determination of the magnetic field produced by the current J which passes through the bar B thus enables the intensity of the said current to be readily obtained if the distance from the centre of the bar to the element which is sensitive to the magnetic field, is known.

Figure 8:
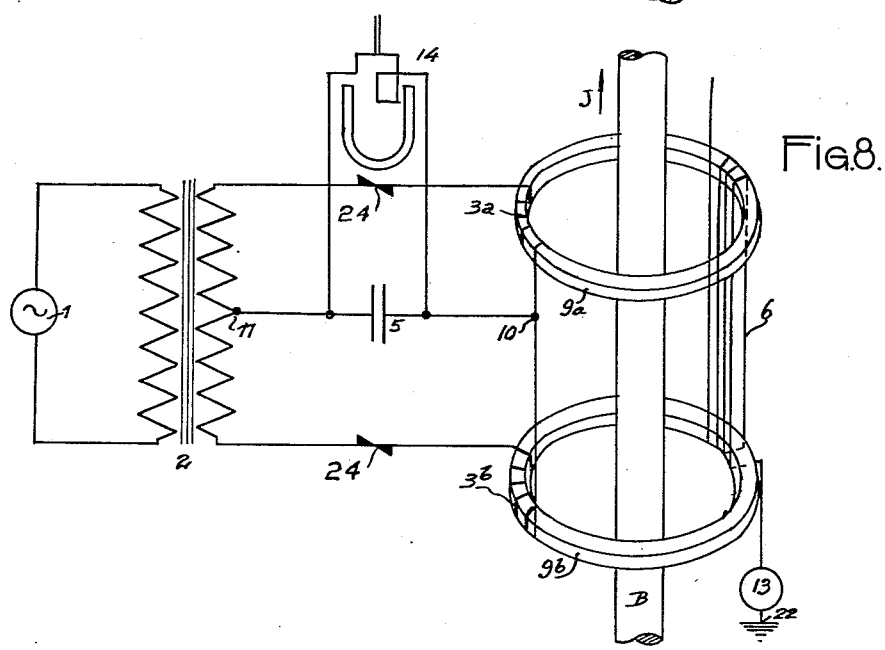
Fig. 8 is an alternative form of Fig. 7 in which the element which is sensitive to the magnetic field is constituted by two magnetic circuits which surround the bar carrying the direct current of high current value.

In Fig. 8, the cores 9a and 9b, which are made of ferro-magnetic alloy of high magnetic permeability, are shaped in the form of rings and surround the bar B.

I claim:

1. A magnetometer comprising a circuit sensitive to a magnetic field constituted by two identical solenoids arranged in parallel, each containing a core of high initial permeability; the circuit which includes them being supplied from a source of alternating current, the amplitude of which produces saturation of the said cores, the said source of alternating current comprising a generator and a transformer, one of the ends of each of the two solenoids being respectively connected to one of the extreme terminals of the secondary winding of the transformer, the two other extremities being joined together and connected to the centre point of the said secondary winding, a galvanometer the moving coil of which without countercouple is included in the connection which joins the centre point of the secondary of the transformer to the common point of the extremities of the two solenoids, and a compensating arrangement constituted by a compensating solenoid surrounding the two solenoids of the circuit which is sensitive to the magnetic field, an oscillator generating a potential at high frequency, a variable member, the moving part of which is rigidly associated with the moving coil of the galvanometer, an impedance, an amplifier-detector, the input terminals of which are connected to the terminals of the said impedance and the output terminals of which supply the said compensating solenoid and an apparatus which measures the output current.

2. A magnetometer comprising a circuit sensitive to a magnetic field constituted by two identical solenoids arranged in parallel, each containing a core of high initial permeability, the circuit which includes them being supplied from a source of alternating current, the amplitude of which produces saturation of the said cores, the said source of alternating current comprising a generator and a transformer, one of the ends of each of the two solenoids being respectively connected to one of the extreme terminals of the secondary winding of the transformer, the two other extremities being joined together and connected to the centre point of the said secondary winding, a galvanometer the moving coil of which without countercouple is included in the connection which joins the centre point of the secondary of the transformer to the common point of the extremities of the two solenoids, and a compensating arrangement constituted by a compensating solenoid surrounding the two solenoids of the element which is sensitive to the magnetic field, an oscillator generating a potential at high frequency, a variable member, the moving part of which is rigidly associated with the moving coil of the galvanometer, an impedance, an amplifier-detector, the input terminals of which are connected to the terminals of the said impedance and the output terminals of which supply the said compensating solenoid and an apparatus which measures the output current, a variable condenser which has a set of moving plates associated with a spindle of the moving coil of the galvanometer and two sets of fixed plates, one connected to the oscillator, the other connected to one of the terminals of the said impedance.

3. A magnetometer comprising a circuit sensitive to a magnetic field constituted by two identical solenoids arranged in parallel, each containing a core of high initial permeability, the circuit which includes them being supplied from a source of alternating current, the amplitude of which produces saturation of the said cores, the said source of alternating current comprising a generator and a transformer, one of the ends of each of the two solenoids being respectively connected to one of the extreme terminals of the secondary winding of the transformer, the two other extremities being joined together and connected to the centre point of the said secondary winding, a galvanometer the moving coil of which without countercouple is included in the connection which joins the centre point of the secondary of the transformer to the common point of the extremities of the two solenoids, a compensating arrangement constituted by a first compensating solenoid surrounding the two solenoids of the element which is sensitive to the magnetic field, an oscillator generating a potential at high frequency, a variable member, the moving part of which is rigidly associated with the moving coil of the galvanometer, an impedance, an amplifier-detector, the input terminals of which supply the said compensating solenoid and an apparatus which measures the output current, and a second compensating solenoid also surrounding the two solenoids of the circuit which is sensitive to the magnetic field, a source of direct current, a rheostat, a change-over switch and a milliammeter, the said second solenoid being in circuit with the said source of current as are also the change-over switch and the milliammeter, the value of the current in this latter circuit, measured by this latter milliammeter, being regulated in such a way that the magnetic flux of the second compensating solenoid in the circuit which is sensitive to the magnetic field compensates for the component of a constant magnetic field, the milliammeter connected in the circuit of the first compensating solenoid, giving indications which are proportional only to the variations of the magnetic field to be measured.

4. A magnetometer comprising a circuit sensitive to a magnetic field constituted by two identical solenoids arranged in parallel, each containing a core of high initial permeability, the circuit which includes them being supplied from a source of alternating current, the amplitude of which produces saturation of the said cores, the said source of alternating current comprising a generator and a transformer, one of the ends of each of the two solenoids being respectively connected to one of the extreme terminals of the secondary winding of the transformer, the two other extremities being joined together and connected to the centre point of the said secondary winding, a galvanometer the moving coil of which without countercouple is included in the connection which joins the centre point of the secondary of the transformer to the common point of the extremities of the two solenoids, a compensating arrangement constituted by a compensating solenoid surrounding the two solenoids of the element which is sensitive to the magnetic field, an oscillator generating a potential at high frequency, a variable member, the moving part of which is rigidly associated with the moving coil of the galvanometer, an impedance, an amplifier-detector, the input terminals of which are connected to the terminals of the said impedance and the output terminals of which supply the said compensating solenoid and an apparatus which measures the output current, and by a second circuit including a source of direct current, a rheostat, a change-over switch and a milliammeter, this circuit being connected in parallel across the terminals of the compensating solenoid, the value of the current which passes through the said circuit and the said compensating solenoid, measured on the latter milliammeter, being adjusted in such a way that the magnetic flux of the said compensating solenoid in the circuit which is sensitive to the magnetic field compensates for the component of a constant magnetic field, the milliammeter connected in the circuit of the compensating solenoid giving indications which are proportional only to the variations of the magnetic field to be measured.

5. A magnetometer comprising a circuit sensitive to the magnetic field constituted by two identical solenoids arranged in parallel, each containing a core of high initial permeability, the circuit which includes them being supplied from a source of alternating current, the amplitude of which produces saturation of the said cores, the said source of alternating current comprising a generator and a transformer, one of the ends of each of the two solenoids, being respectively connected to one of the extreme terminals of the secondary winding of the transformer, the two other extremities being joined together and connected to the centre point of the said secondary winding, a galvanometer the moving coil of which without countercouple is included in the connection which joins the centre point of the secondary of the transformer to the common point of the extremities of the two solenoids, a compensating arrangement constituted by a compensating solenoid surrounding the two solenoids of the element which is sensitive to the magnetic field, an oscillator generating a potential at high frequency, a variable member, the moving part of which is rigidly associated with the moving coil of the galvanometer, an impedance, an amplifier-detector, the input terminals of which are connected to the terminals of the said impedance and which supplies through its output terminals a milliammeter and a universal shunt, to the terminals of which are connected the said compensating solenoid and a resistance, and by a second circuit including the source of direct current, a rheostat, a change-over switch and a milliammeter, this circuit being in parallel across the terminals of the compensating solenoid, the value of the current which flows through the said circuit and the said compensating solenoid measured on this latter milliammeter, being adjusted in such a way that the magnetic flux of the said compensating solenoid in the circuit which is sensitive to the magnetic field, compensates for the component of a constant magnetic field, the milliammeter connected in the circuit of the compensating solenoid giving indications which are proportional only to the variations of the magnetic field which is to be measured.

6. A magnetometer comprising a circuit sensitive to the magnetic field constituted by two identical solenoids arranged in parallel, each containing a core of high initial permeability, the circuit which includes them being supplied from a source of alternating current, the amplitude of which produces saturation of the said cores, the said source of alternating current comprising a generator and a transformer, one of the ends of each of the two solenoids being respectively connected to one of the extreme terminals of the secondary winding of the transformer, the two other extremities being joined together and connected to the centre point of the said secondary winding, is a galvanometer the moving coil of which without countercouple is included in the connection which joins the centre point of the secondary of the transformer to the common point of the extremities of the two solenoids, and a compensating arrangement constituted by a first compensating solenoid surrounding one of the two solenoids of the element which is sensitive to the magnetic field, an oscillator generating a potential at high frequency, a variable member, the moving part of which is rigidly associated with the moving coil of the galvanometer, an impedance, an amplifier-detector, the input terminals of which are connected to the terminals of the said impedance and the output terminals of which supply the said compensating solenoid and an apparatus which measures the output current, and two other compensating solenoids, each surrounding one of the two solenoids of the circuit which is sensitive to the magnetic field, a source of direct current, a rheostat, a change-over switch and a milliammeter, these two latter solenoids being in circuit with the said source of current as well as the change-over switch and the milliammeter, the value of the current flowing in this latter circuit, measured by this latter milliammeter, being adjusted in such manner that the magnetic flux of the two latter solenoids in the circuit which is sensitive to the magnetic field compensates for the component of a constant magnetic field, the milliammeter connected in the circuit of the first compensating solenoid giving indications which are proportional only to the variations of the component of the magnetic field which is to be measured.

References Cited in the file of this patent

UNITED STATES PATENTS

| | | |
|---|---|---|
| 2,016,977 | Thomas | Oct. 8, 1935 |
| 2,406,870 | Vacquier | Sept. 3, 1946 |
| 2,421,583 | Stuart | June 3, 1947 |
| 2,584,571 | Frowe | Feb. 5, 1952 |
| 2,605,302 | Specht | July 29, 1952 |